US012676502B2

(12) United States Patent
Yang et al.

(10) Patent No.: US 12,676,502 B2
(45) Date of Patent: Jul. 7, 2026

(54) PLATFORM AND METHOD FOR POWER GRID FREQUENCY REGULATION WITH PARTICIPATION OF LARGE-SCALE ENERGY STORAGE BASED ON MADDPG

(71) Applicant: WUHAN UNIVERSITY, Hubei (CN)

(72) Inventors: Jun Yang, Hubei (CN); Yuxin Wen, Hubei (CN); Peixiao Fan, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 399 days.

(21) Appl. No.: 18/406,185

(22) Filed: Jan. 7, 2024

(65) Prior Publication Data

US 2025/0096600 A1 Mar. 20, 2025

(30) Foreign Application Priority Data

Sep. 14, 2023 (CN) .......................... 202311189643.0

(51) Int. Cl.
H02J 13/12 (2026.01)
H02J 103/30 (2026.01)
H02J 103/35 (2026.01)

(52) U.S. Cl.
CPC ........... H02J 13/12 (2026.01); H02J 2103/30 (2026.01); H02J 2103/35 (2026.01)

(58) Field of Classification Search
CPC .... H02J 13/12; H02J 2103/30; H02J 2103/35; H02J 3/32; H02J 3/28; H02J 3/00142; G06N 3/006; G06N 3/092; G06Q 50/06
See application file for complete search history.

(56) References Cited

FOREIGN PATENT DOCUMENTS

| | | | | | |
|---|---|---|---|---|---|
| CN | 115085202 A | * | 9/2022 | ............. | G06F 17/15 |
| CN | 116565952 A | * | 8/2023 | .......... | H02J 3/00142 |

* cited by examiner

*Primary Examiner* — Charles Cai
(74) *Attorney, Agent, or Firm* — JCIP GLOBAL INC.

(57) ABSTRACT

The present disclosure relates to the field of frequency control technologies of power grid systems and in particular to a platform and method for power grid frequency regulation with participation of large-scale energy storage based on MADDPG. Firstly, based on a scene of power grid frequency regulation with participation of large-scale energy storage, a control platform architecture for power grid frequency regulation with participation of large-scale energy storage based on MADDPG is designed. Then, based on the multiple agents deep deterministic policy gradient algorithm, under the drive of environmental interaction data, training and learning are performed to obtain optimal control multiple agents for power grid frequency regulation with participation of energy storage. Finally, by using the optimal control multiple agents, control on the output power of the thermal power unit and the charge and discharge of the large-scale energy storage is performed for participation of power grid frequency regulation.

12 Claims, 6 Drawing Sheets

--- in the scene of power grid frequency regulation with participation of large-scale energy storage, a control platform architecture for power grid frequency regulation with participation of large-scale energy storage based on MADDPG is designed. — S1

Based on the MADDPG algorithm, under the drive of environment interaction data, training and learning are performed to obtain optimal control multiple agents for power grid frequency regulation with participation of the energy storage. — S2 by using the optimal control multiple agents, control on the output power of the thermal power unit and the charge and discharge of the large-scale energy storage is performed for participation in power grid frequency regulation. . — S3

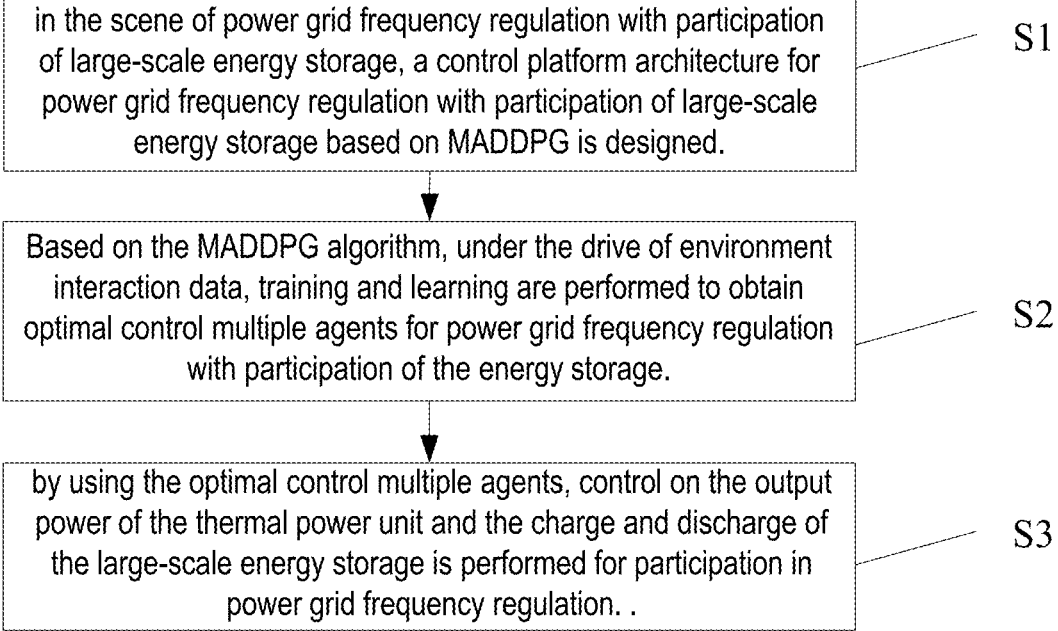

in the scene of power grid frequency regulation with participation of large-scale energy storage, a control platform architecture for power grid frequency regulation with participation of large-scale energy storage based on MADDPG is designed.    S1

Based on the MADDPG algorithm, under the drive of environment interaction data, training and learning are performed to obtain optimal control multiple agents for power grid frequency regulation with participation of the energy storage.    S2 by using the optimal control multiple agents, control on the output power of the thermal power unit and the charge and discharge of the large-scale energy storage is performed for participation in power grid frequency regulation. .    S3

FIG. 1

PLATFORM AND METHOD FOR POWER GRID FREQUENCY REGULATION WITH PARTICIPATION OF LARGE-SCALE ENERGY STORAGE BASED ON MADDPG

CROSS-REFERENCE TO RELATED APPLICATION

This application claims the priority benefit of China application serial no. 202311189643.0, filed on Sep. 14, 2023. The entirety of the above-mentioned patent application is hereby incorporated by reference herein and made a part of this specification.

BACKGROUND

Technical Field

The present disclosure relates to the field of frequency control technologies of the power grid systems, and in particular to a platform and a method for power grid frequency regulation with participation of large-scale energy storage based on MADDPG (Multiple Agents Deep Deterministic Policy Gradient).

Description of Related Art

As the renewable energy generation scale continuously increases, the problem of wind and photovoltaic uncertainty brings severe challenges to the frequency stability operation of the power grids. The conventional frequency regulation units mainly with the thermal power units has a gradually-decreasing effectiveness on the frequency safety of the power grids due to its frequency regulation limitation in the context of the new-type power systems, and hence restricts scale development of the new energy grid connection. The energy storage has the frequency regulation advantages of fast response and accurate control and the like and thus can realize more superior combined frequency regulation effect in combination with the conventional frequency regulation units in the new-type power systems.

The random load fluctuation and real-time frequency deviation in the power grid systems both are complex and random nonlinear data. In the frequency regulation scene with massive complex data, the conventional frequency regulation policy cannot satisfy the control accuracy requirement of the current complex frequency regulation scene containing large-scale energy storage. Meanwhile, in such large-scale multiple-control-object scenes, the conventional control method is ineffective in coordination of the control strategies between control objects. The MADDPG (Multiple Agents Deep Deterministic Policy Gradient) algorithm can achieve synergic control between different control objects by continuous interactions in the multiple agents environment and also can reduce and control the computation time to achieve quick response and give an optimal control policy. Therefore, there is provided a control method and platform for power grid frequency regulation with participation of large-scale energy storage based on MADDPG.

SUMMARY

In order to increase the frequency regulation capability of a new-type power system and ensure a supply and demand balance relationship of large-scale energy storage, the present disclosure provides a control platform and method for power grid frequency regulation with participation of large-scale energy storage based on MADDPG (Multiple Agents Deep Deterministic Policy Gradient).

In a scene of power grid frequency regulation with participation of large-scale energy storage, the present disclosure provides a control platform architecture for power grid frequency regulation with participation of large-scale energy storage based on MADDPG. The control platform architecture is a three-layer architecture designed respectively into a state space layer, an interaction transfer layer and a control command layer.

The state space layer comprises a power grid state monitoring apparatus, a thermal power unit and a large-scale energy storage apparatus, to achieve real-time data monitoring and collection for a frequency deviation state or the like of a power grid, a frequency regulation capacity of the thermal power unit, and a capacity of the energy storage apparatus; the interaction transfer layer comprises two functions, one of which is to process data of the state space layer and transmitting observation information data of an environment for the control command layer, and the other is to, based on control instructions of optimal control multiple agents in the control command layer, performing power output adjustment to the thermal power unit in the state space layer and performing charge and discharge control on the large-scale energy storage apparatus for participation in power grid frequency regulation; the control command layer is that the optimal control multiple agents execute corresponding action instructions based on power grid environment information obtained from the interaction transfer layer and its own optimal control policy.

The present disclosure further provides a control method for power grid frequency regulation with participation of large-scale energy storage based on MADDPG. The method comprises the following steps:

S01: based on MADDPG algorithm, performing training and learning under the drive of environment interaction data to obtain optimal control multiple agents for participation of the energy storage in power grid frequency regulation;

S02: by using the optimal control multiple agents, performing control on an output power of the thermal power unit and on charge and discharge of the large-scale energy storage for participation in power grid frequency regulation.

In the control method for power grid frequency regulation with participation of large-scale energy storage based on MADDPG, the step S01 can be performed in the following steps:

First, based on a scene of a primary power grid frequency regulation with participation of the large-scale energy storage, it is described as a Markov game process, comprising the following components:

(1) the number N of multiple agents: in the frequency regulation scene, determining the corresponding number of agents based on the number of control apparatuses;

(2) state space S: state information to be obtained by the multiple agents in control process;

(3) action space A: executing corresponding control actions by the multiple agents based on current state information and its own policy in the control process;

(4) reward function R: after sending control action instructions, the multiple agents obtain rewards fed back from the environment to determine the superiority of the current policy;

(5) discount factor γ: representing an influence degree of a future reward on the present;

Second, based on the scene of the power grid frequency regulation with participation of the energy storage, a state space, an action space and a reward function are determined; each agent obtains from the power grid the state information, comprising a load fluctuation and a frequency deviation of the power grid, upper and lower limit constraints of the frequency regulation capacity of the thermal power unit, and upper and lower limit constraints of charge and discharge of each energy storage apparatus, wherein the state information is integrated into the state space with expression in formula (1):

$$S = [\Delta f(t), P_g^+(t), P_g^-(t), \quad \text{formula (1)}$$
$$P_{bes,1}^+(t), P_{bes,1}^-(t), \dots , P_{bes,k}^+(t), P_{bes,k}^-(t)]$$

wherein $\Delta f(t)$ is a frequency deviation of the power grid at a moment t, $$P_g^+(t) \text{ and } P_g^-(t)$$

are upper and lower capacity limits for participation of the thermal power unit in frequency regulation at a moment t, and $$P_{bes,k}^+(t) \text{ and } P_{bes,k}^-(t)$$

are upper and lower charge and discharge limits of the energy storage apparatus k at a moment t;

setting of the number of multiple agents: one agent is set for the frequency regulation apparatuses respectively, and (1+k) agents corresponding to one thermal power unit and k energy storage apparatuses are set; corresponding to different agents, the state space is selected in the formula (1) based on own circumstances, the agents of the thermal power unit obtain the frequency deviation and the state information of the upper and lower limits of the thermal power unit; and the agents of the energy storage apparatus obtain the frequency deviation and the state information of the upper and lower charge and discharge limits of the energy storage apparatus;

setting of the action space: the action space of the entire power grid frequency regulation comprises a set of control actions of different agents for the thermal power unit and the energy storage apparatus, with its expression shown in below formula (2):

$$A = [A_g, A_1, \dots , A_k] \quad \text{formula (2)}$$
$$\begin{cases} A_g = \Delta P_g(t) & \text{formula (3)} \\ A_k = P_{bes,k}(t) \end{cases}$$

wherein, wherein $\Delta P_g(t)$ represents a power output adjustment amount of the thermal power unit at a moment t, and $\Delta P_{bes,k}(t)$ represents a charge and discharge power of the energy storage apparatus k at a moment t;

For the design of reward function, it is based on a conservative principle of the working regulations of power safety of China, namely, the frequency change range of the power grid in stable and safe operation is 50±0.2 Hz, and on this basis, consideration is given to an adjustment dead zone in power grid frequency regulation containing energy storage while set interval division is performed based on the frequency deviation of the power grid. In conclusion, a corresponding reward function can be designed, with its expression in below formula (4):

$$r_g = \begin{cases} 0 & |\Delta f| < 0.03 \quad \text{formula (4)} \\ -\mu_1|\Delta f| & 0.03 \le |\Delta f| < 0.08 \\ -\mu_2|\Delta f| & 0.08 \le |\Delta f| < 0.12 \\ -\mu_3|\Delta f| & 0.12 \le |\Delta f| < 0.16 \\ -\mu_4|\Delta f| & 0.16 \le |\Delta f| < 0.2 \\ -\mu_5|\Delta f| & 0.2 \le |\Delta f| \end{cases}$$

wherein $r_g$ represents a reward function of the agent of the thermal power unit, and $\mu_1$, $\mu_2$, $\mu_3$, $\mu_4$ and Us represent weight values corresponding to the reward functions of the control intervals of the frequency deviation. When the frequency deviation is in an adjustment dead zone [0, 0.03] Hz, the frequency deviation is far less than a minimum error requirement for normal operation and the reward value of the agent is set to 0; when the frequency deviation is in different set intervals, an agent controller obtains a corresponding negative reward, i.e. penalty value.

$$r_{bes} = \begin{cases} 0 & |\Delta f| < 0.04 \quad \text{formula (5)} \\ -\delta_1|\Delta f| & 0.04 \le |\Delta f| < 0.08 \\ -\delta_2|\Delta f| & 0.08 \le |\Delta f| < 0.12 \\ -\delta_3|\Delta f| & 0.12 \le |\Delta f| < 0.16 \\ -\delta_4|\Delta f| & 0.16 \le |\Delta f| < 0.2 \\ -\delta_5|\Delta f| & 0.2 \le |\Delta f| \end{cases}$$

where $r_{bes}$ represents a reward function of the agent of the energy storage apparatus, and $\delta_1$, $\delta_2$, $\delta_3$, $\delta_4$ and $\delta_5$ represent weight values corresponding to the reward functions of the control intervals of the frequency deviation.

Then, training and learning of an agent control model are performed based on the MADDPG (multiple agents deep deterministic policy gradient) algorithm. The random load fluctuation and real-time frequency deviation in the power grid systems both are complex and random nonlinear data. The multiple agents deep deterministic policy gradient algorithm combines deep neural network and reinforcement learning algorithm to effectively process large-scale data and gives a real-time decision by interacting with the power grid environment so as to obtain an optimal control solution. The algorithm flow is described below.

(1) setting a total number N of cyclic trainings and initializing an experience replay pool D and a multiple agents policy network $\pi(S_t|\theta)$;

(2) setting a round number M of trainings;

(3) initializing a current environmental state $S_0$;

(4) for each agent, based on environment state information of current moment, generating random actions superimposed with Gaussian distribution noise to perform interactive exploration with the power grid environment, with the expression in below formula (6):

$$A = \pi(S_t|\theta) + \lambda \quad \text{formula (6)}$$

wherein $\theta$ represents a policy network parameter of multiple agents, and $\lambda$ represents Gaussian distribution noise;

(5) based on the action instructions executed by the multiple agents, returning, by the power grid environment, the corresponding reward function $R_t$ and transferring to a state $S_{t+1}$ of a next moment;

(6) storing the information of $(S_t, A_t, R_t, S_{t+1})$ to the experience replay pool;

(7) when the information stored in the experience replay pool reaches a specified amount $D_x$, performing update of the multiple agents based on randomly-selected batch data, calculating a corresponding loss function J and using the MSE (Mean Square Error) method to perform gradient update of the policy network, with its expression in below formula (7):

$$J = \frac{1}{N}\sum_{j}(y_j - Q(s_j, \pi(s_{j+1}|\theta)|\theta_{critic}))^2 \qquad \text{formula (7)}$$

wherein, $$y_j = r_{j+1} + \gamma Q(s_{j+1}, \pi(s_{j+1}|\theta^-)|\theta_{critic}^-) \qquad (8)$$

wherein Q represents a state action value function, $\theta$ and $\theta^-$ respectively represent parameters of the policy network and its target network, $\theta_{critic}$ and $$\theta_{critic}^-$$

respectively represent parameters of an evaluation network and its target network;

(8) after training rounds are completed, updating a network parameter with the expression in below formula (9):

$$\begin{cases} \theta^- = \tau\theta + (1 - \tau)\theta^- \\ \theta_{critic}^- = \tau\theta_{critic} + (1 - \tau)\theta_{critic}^- \end{cases} \qquad \text{formula (9)}$$

wherein $\tau$ is an update parameter;

(9) after cyclic trainings are completed, obtaining an optimal control multiple agents model.

The step S02 can be performed in the following steps:

The upper control command layer collects the power grid environment information from the state space layer by the interaction transfer layer, where the power grid environment information comprises the frequency deviation, the upper and lower limit constraints of the thermal power unit, and the upper and lower limit constraints of charge and discharge of the energy storage apparatus; based on the optimal control multiple agents model, the optimal control policy is used and a corresponding action instruction is given, and the interaction transfer layer, based on the upper-layer action instruction, performs power output control on the thermal power unit and charge and discharge control on the energy storage apparatus in the lower state space layer, so as to achieve optimal control on the primary power grid frequency regulation with participation of the energy storage.

The present disclosure further provides an electronic device, comprising a memory, a processor and a computer program stored in the memory and run on the processor, the processor executes the program to perform any of the above control methods for power grid frequency regulation with participation of large-scale energy storage based on MADDPG.

The present disclosure further provides a non-transient computer readable storage medium, storing a computer program, the computer program is executed by a processor to perform any of the above control methods for power grid frequency regulation with participation of large-scale energy storage based on MADDPG.

The present disclosure further provides a computer program product, comprising a computer program, the computer program is executed by a processor to perform any of the above control methods for power grid frequency regulation with participation of large-scale energy storage based on MADDPG.

Compared with the prior arts, the present disclosure has the following beneficial effects: in the control method for power grid frequency regulation with participation of large-scale energy storage based on MADDPG according to the present disclosure, in a training process, an optimal control multiple agents policy model is trained by continuous interactions of the multiple agents with the environment, and thus, in the application processes, the problem of large-scale multiple-control-object synergic control can be addressed, with adaptation to random and complex non-linear data such as random load fluctuation and frequency deviation and the like, finally achieving fast response and giving the optimal control method, and hence ensuring safety and stability of the frequency regulation.

BRIEF DESCRIPTION OF THE DRAWINGS

In order to more clearly describe the technical solutions in the present disclosure or in the prior arts, drawings required for descriptions of the embodiments or the prior arts will be briefly introduced below. Apparently, the drawings described herein are merely some embodiments of the present disclosure. Those skilled in the arts can obtain other drawings based on these drawings without carrying out creative work.

FIG. 1 is a flowchart of designing a control method and platform for power grid frequency regulation with participation of large-scale energy storage based on MADDPG according to an embodiment of the present disclosure.

Numerals of the drawings are described below: 810. Processor; 820. communication interface; 830. memory; and 840. communication bus.

DESCRIPTION OF THE EMBODIMENTS

In order to make the objects, technical solutions and advantages of the present disclosure clearer, the technical solutions in the present disclosure will be fully and clearly described in combination with the drawings of the present disclosure. Apparently, the embodiments described herein are only some embodiments of the present disclosure rather than all embodiments. All other embodiments by those skilled in the arts based on these embodiments of the present disclosure without carrying out creative work shall fall within the scope of protection of the present disclosure.

As shown in FIG. 1, it is provided a control platform and method for power grid frequency regulation with participation of large-scale energy storage based on MADDPG (Multiple Agents Deep Deterministic Policy Gradient) in this embodiment.

Figure 2:
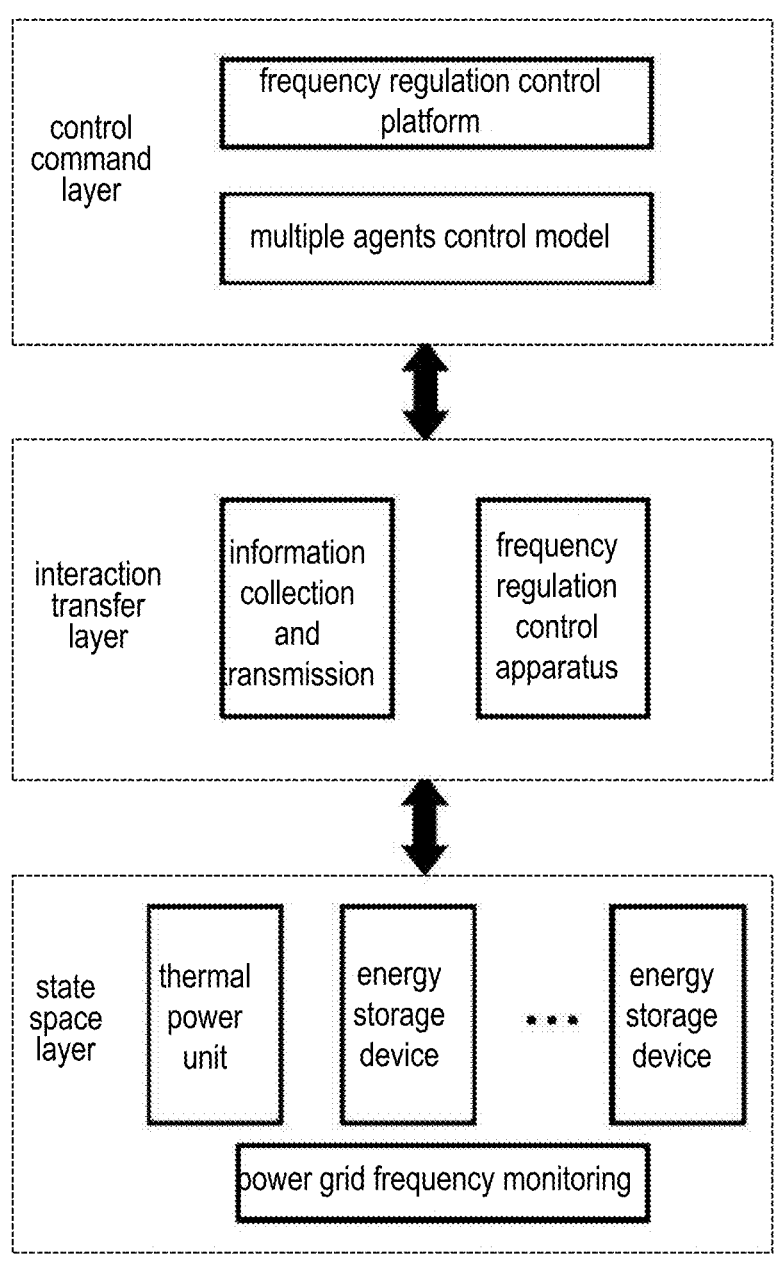
FIG. 2 is an architecture diagram of a control platform for power grid frequency regulation with participation of large-scale energy storage based on MADDPG according to an embodiment of the present disclosure.

The control platform is a three-layer architecture which is respectively designed into a state space layer, an interaction transfer layer, and a control command layer. The platform architecture diagram is as shown in FIG. 2.

Firstly, environmental information such as a frequency deviation, a thermal power unit and a large-scale energy storage apparatus is obtained from the state space layer. This environmental information is an information set of the state space for a multi-agent model, with its expression in formula (1):

$$S = [\Delta f(t), P_g^+(t), P_g^-(t),$$

$$P_{bes,1}^+(t), P_{bes,1}^-(t), \dots , P_{bes,k}^+(t), P_{bes,k}^-(t)] \qquad \text{formula (1)}$$

where $\Delta f(t)$ represents the frequency deviation of the power grid at a moment t, $$P_g^+(t) \text{ and } P_g^-(t)$$

represent upper and lower capacity limits for participation of the thermal power unit in frequency regulation at a moment t, and $$P_{bes,k}^+(t) \text{ and } P_{bes,k}^-(t)$$

are upper and lower charge and discharge limits of the energy storage apparatus k at a moment t.

Next, by using the interaction transfer layer, information data is processed and transferred to the control command layer, and then in the control command layer, based on the trained multiple agents control model, fast response is made to give an optimal control method, i.e. a control instruction set of all devices, and then the control instruction set is distributed to a device control apparatus in the interaction transfer layer. The instruction set is an action space of the multiple agents model, with its expression in below formula (2):

$$A = [A_g, A_1, \dots , A_k] \qquad \text{formula (2)}$$

Figure 3:
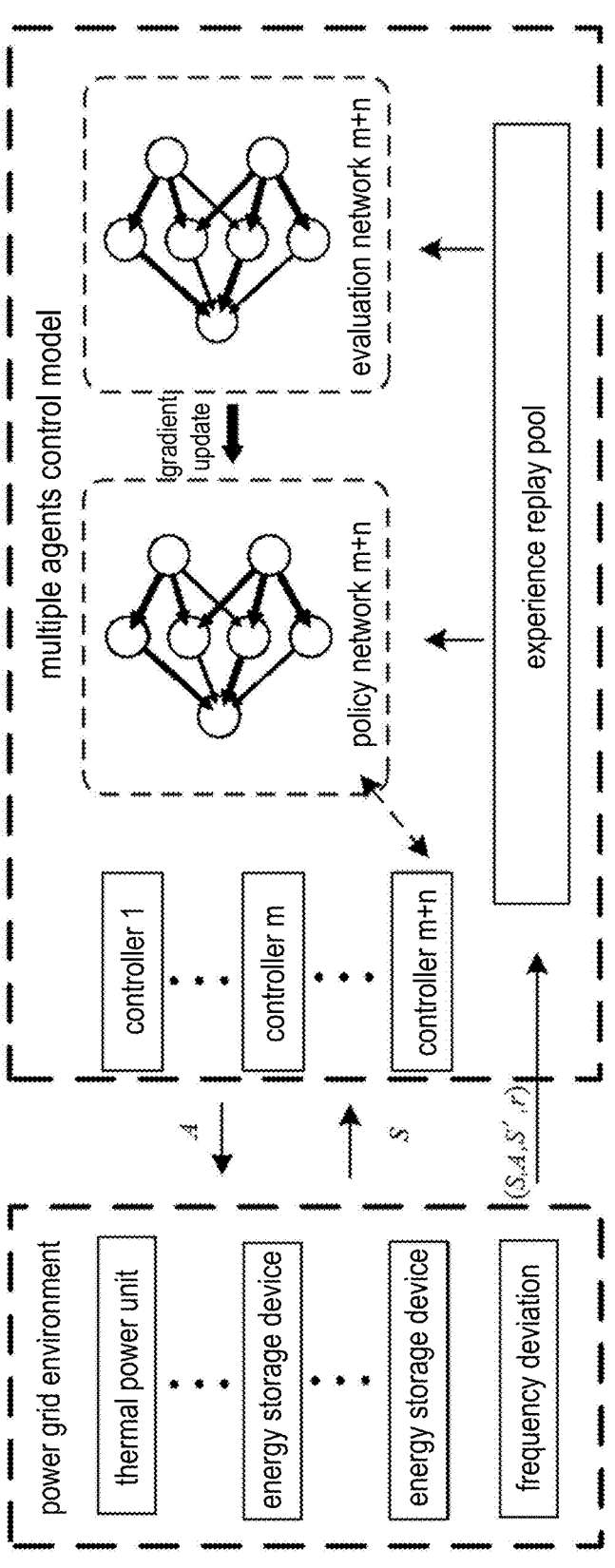
FIG. 3 is a flowchart illustrating algorithm of a control method for power grid frequency regulation with participation of large-scale energy storage based on MADDPG according to an embodiment of the present disclosure.

-continued $$\begin{cases} A_g = \Delta P_g(t) \\ A_k = P_{bes,k}(t) \end{cases} \qquad \text{formula (3)}$$

where, where $\Delta P_g(t)$ represents a power output adjustment amount of the thermal power unit at a moment t, and $\Delta P_{bes,k}(t)$ represents a charge and discharge power of the energy storage apparatus k at a moment t. The MADDPG algorithm flow of the multiple agents control model is as shown in FIG. 3 and will not be repeated herein.

Finally, control on the power output adjustment of the thermal power unit and the charge and discharge of the large-scale energy storage apparatus is performed so as to achieve optimal control for the power grid frequency regulation with participation of large-scale energy storage and ensure safety and stability of the frequency regulation.

Figure 4:
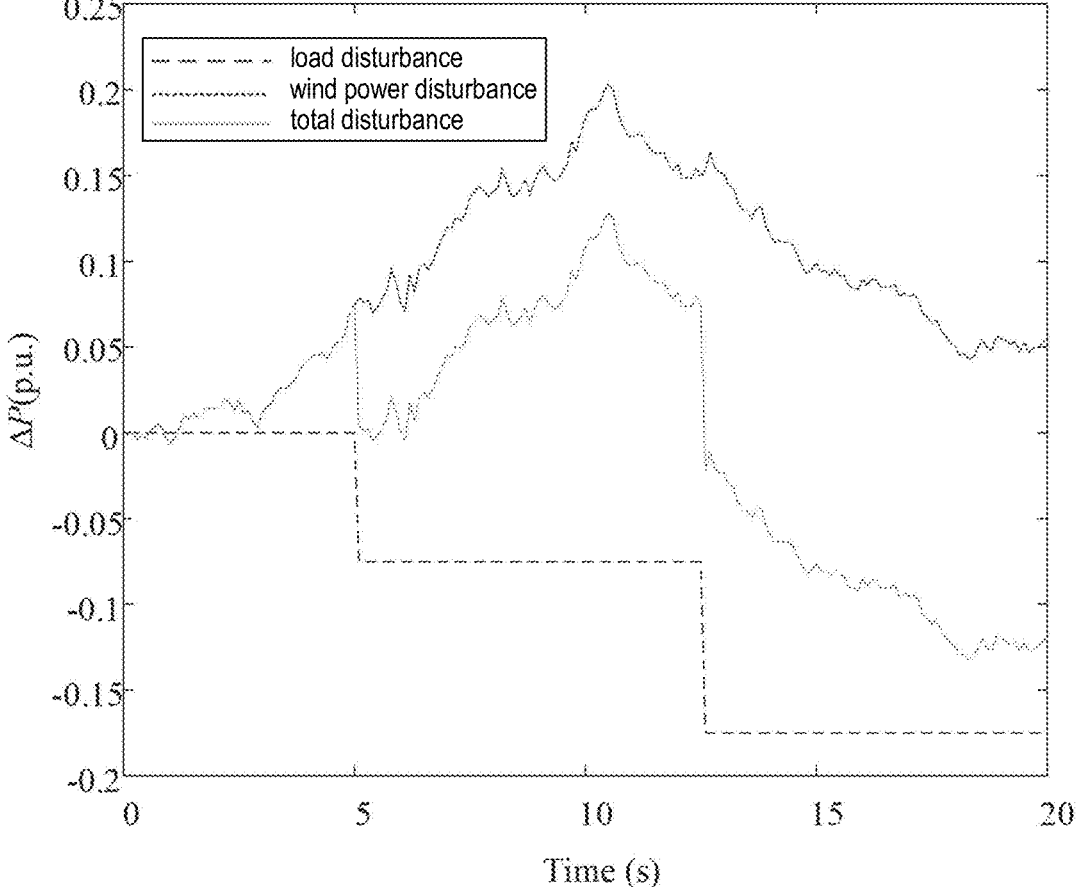
FIG. 4 is a disturbance data curve diagram of a control method and platform for power grid frequency regulation with participation of large-scale energy storage based on MADDPG according to an embodiment of the present disclosure.

As shown in FIG. 4, it is a curve of disturbance data of a particular system, where the disturbance data comprises load disturbance and wind power disturbance, both are random disturbances. In the reward function design of the multiple agents, based on the principle of the working regulations of power safety, the frequency change range of the power grid in stable and safe operation is 50±0.2 Hz, and on this basis, consideration is given to an adjustment dead zone in power grid frequency regulation containing energy storage while set interval division is performed based on the frequency deviation of the power grid. In conclusion, a corresponding reward function can be designed, with its expression in below formula (4):

$$r_g = \begin{cases} 0 & |\Delta f| < 0.03 \\ -\mu_1 |\Delta f| & 0.03 \le |\Delta f| < 0.08 \\ -\mu_2 |\Delta f| & 0.08 \le |\Delta f| < 0.12 \\ -\mu_3 |\Delta f| & 0.12 \le |\Delta f| < 0.16 \\ -\mu_4 |\Delta f| & 0.16 \le |\Delta f| < 0.2 \\ -\mu_5 |\Delta f| & 0.2 \le |\Delta f| \end{cases} \qquad \text{formula (4)}$$

where $r_g$ represents a reward function of the agent of the thermal power unit, and $\mu_1$, $\mu_2$, $\mu_3$, $\mu_4$ and us represent weight values corresponding to the reward functions of the control intervals of the frequency deviation. When the frequency deviation is in an adjustment dead zone [0, 0.03] Hz, the frequency deviation is far less than a minimum error requirement for normal operation and the reward value of the agent is set to 0; when the frequency deviation is in different set intervals, an agent controller obtains a corresponding negative reward, i.e. penalty value.

$$r_{bes} = \begin{cases} 0 & |\Delta f| < 0.04 \\ -\delta_1 |\Delta f| & 0.04 \le |\Delta f| < 0.08 \\ -\delta_2 |\Delta f| & 0.08 \le |\Delta f| < 0.12 \\ -\delta_3 |\Delta f| & 0.12 \le |\Delta f| < 0.16 \\ -\delta_4 |\Delta f| & 0.16 \le |\Delta f| < 0.2 \\ -\delta_5 |\Delta f| & 0.2 \le |\Delta f| \end{cases} \qquad \text{formula (5)}$$

where $r_{bes}$ represents a reward function of the agent of the energy storage apparatus, and $\delta_1$, $\delta_2$, $\delta_3$, $\delta_4$ and $\delta_5$ represent weight values corresponding to the reward functions of the control intervals of the frequency deviation.

Figure 5:
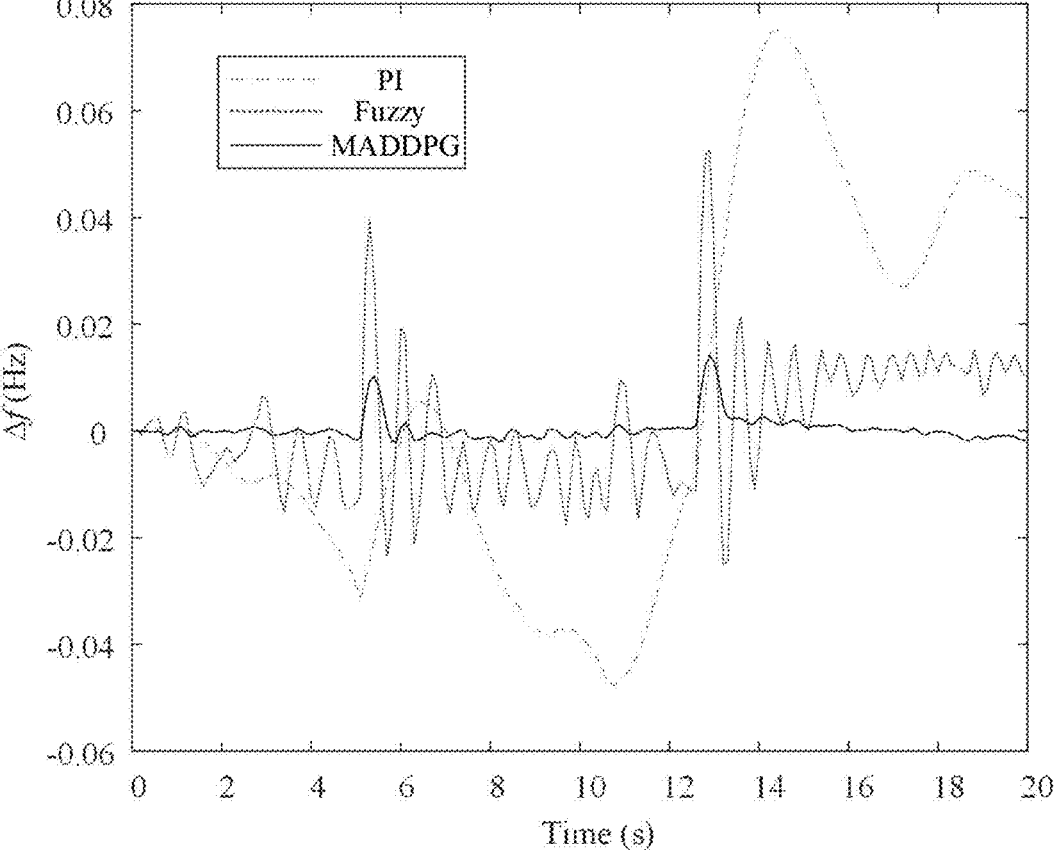
FIG. 5 is a comparison diagram of algorithm effects of a control method and platform for power grid frequency regulation with participation of large-scale energy storage based on MADDPG according to an embodiment of the present disclosure.

FIG. 5 is a comparison curve diagram of the frequency regulation effect generated by using the method in the present disclosure. Compared with the conventional algorithms (Fuzzy and PI), the frequency of the system containing large-scale energy storage is controlled by using the multiple agents model (MADDPG) such that the system has a lower frequency deviation on the entirety, thus guaranteeing the safety and stability of the frequency regulation.

Figure 6:
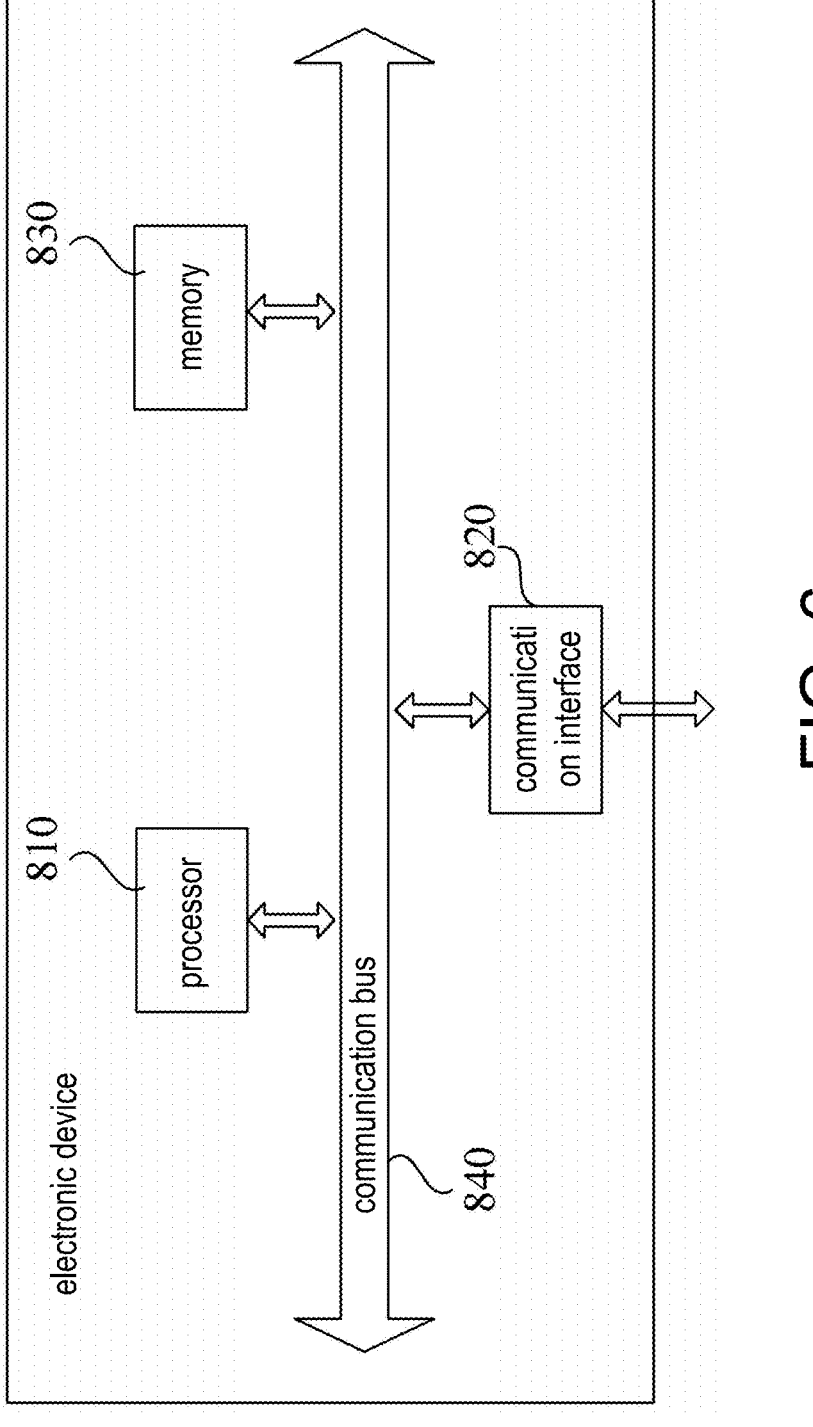
FIG. 6 is a structural schematic diagram illustrating an electronic device according to an embodiment of the present disclosure.

FIG. 6 is an entity structure diagram of an electronic device. As shown in FIG. 6, the electronic device may comprise: a processor 810, a communication interface 820, a memory 830 and a communication bus 840. The processor 810, the communication interface 820 and the memory 830 complete mutual communication via the communication bus 840. The processor 810 can invoke logic instructions in the memory 830 to perform the control method for power grid frequency regulation with participation of large-scale energy storage based on MADDPG.

Furthermore, the logic instructions in the above memory 830 may, when implemented in the form of software functional unit and sold or used as independent product, be stored in one computer readable storage medium. Based on such understanding, the technical solutions of the present disclosure essentially or a part contributing to the prior art or part of the technical solutions may be embodied in the form of a software product, and the software product is stored in a storage medium, and comprises several instructions for enabling a computer device (such as a personal computer, a server or a network device) to execute all or part of the steps of the method disclosed by the embodiments of the present disclosure; and the above storage mediums comprise various mediums such as a USB flash disk, a removable hard disk drive, a read-only memory (ROM), a random access memory (RAM), a diskette or a compact disk and the like which may store program codes.

In another aspect, the present disclosure further provides a computer program product, comprising a computer program, where the computer program may be stored in a non-transient computer readable storage medium, and the computer program is executed by a processor to cause a computer to perform the above control method for power grid frequency regulation with participation of large-scale energy storage based on MADDPG.

In still another aspect, the present disclosure further provides a non-transient computer readable storage medium storing a computer program, where the computer program is executed by a processor to perform the above control method for power grid frequency regulation with participation of large-scale energy storage based on MADDPG.

The above-described apparatus embodiments are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Persons of ordinary skill in the arts can understand and carrying out the present disclosure without making creative work.

Based on the descriptions of the above embodiments, the technicians in the arts can clearly understand that each embodiment can be implemented by software plus necessary general hardware platform, or by hardware. Based on such understanding, the above technical solutions essentially or a part contributing to the prior art may be embodied in the form of a software product, and the software product is stored in a computer readable storage medium such as ROM/RAM, magnetic diskette and compact disk and the like and comprises several instructions for enabling a computer device (such as a personal computer, a server or a network device) to execute the method of each embodiment or some parts of the embodiment of the present disclosure.

Finally, it should be noted that the above embodiments are used only to describe the specific technical solutions of the present disclosure and not to limit the present disclosure. Although detailed descriptions are made to the present disclosure by referring to the preceding embodiments, those skilled in the art should understand that any person of this prior art may still make modifications to the technical solutions recorded in the above embodiments or make equivalent substitutions to part of technical features therein within the technical scope of the present disclosure. Such modifications and substitutions will not cause the essence of the corresponding technical solutions to depart from the spirit and scope of the technical solutions of the embodiments of the present disclosure.

What is claimed is:

1. A control platform for power grid frequency regulation with participation of large-scale energy storage based on MADDPG (Multiple Agents Deep Deterministic Policy Gradient), comprising: a three-layer architecture of a state space layer, an interaction transfer layer and a control command layer;

the state space layer comprises a power grid state monitoring apparatus, a thermal power unit and a large-scale energy storage apparatus, to achieve a real-time data monitoring and collection for a frequency deviation state of a power grid, a frequency regulation capacity of the thermal power unit, and a capacity of the energy storage apparatus;

the interaction transfer layer comprises processing data of the state space layer and transmitting observation information data of an environment for the control command layer; based on control instructions of optimal control multiple agents in the control command layer, performing a power output adjustment to the thermal power unit in the state space layer and performing a charge and discharge control on the large-scale energy storage apparatus for participation in a power grid frequency regulation;

the control command layer comprises executing, by the optimal control multiple agents, corresponding action instructions based on power grid environment information obtained from the interaction transfer layer and its own optimal control policy.

2. A control method for power grid frequency regulation with participation of large-scale energy storage based on MADDPG (Multiple Agents Deep Deterministic Policy Gradient), comprising:

based on a MADDPG algorithm, performing a training and learning under a drive of environment interaction data to obtain optimal control multiple agents for participation of an energy storage in a power grid frequency regulation;

by using the optimal control multiple agents, performing a control on an output power of an thermal power unit and on a charge and discharge of a large-scale energy storage for participation in a power grid frequency regulation, which comprises following smart control process:

an upper control command layer collects power grid environment information from a state space layer by an interaction transfer layer, wherein the power grid environment information comprises a frequency deviation, upper and lower limit constraints of the thermal power unit, and upper and lower limit constraints of charge and discharge of an energy storage apparatus; based on an optimal control multiple agents model, an optimal control policy is used and a corresponding action instruction is given, and an interaction transfer layer, based on the upper-layer action instruction, performs a power output control on the thermal power unit and a charge and discharge control on an energy storage apparatus in the lower state space layer, so as to achieve optimal control on a primary power grid frequency regulation with participation of the energy storage.

3. The control method of claim 2, wherein, based on the MADDPG algorithm, performing the training and learning under the drive of the environment interaction data to obtain the optimal control multiple agents for participation of the energy storage in the power grid frequency regulation comprises following steps:

step 1) based on a scene of a primary power grid frequency regulation with participation of the large-scale energy storage, it is described as a Markov game process, comprising following components:

(1-1) a number N of multiple agents: in a frequency regulation scene, determining a corresponding number of agents based on a number of control apparatuses;

(1-2) a state space S: state information to be obtained by the multiple agents in a control process;

(1-3) an action space A: executing corresponding control actions by the multiple agents based on current state information and its own policy in the control process;

(1-4) a reward function R: after sending control action instructions, the multiple agents obtain rewards fed back from an environment to determine a superiority of a current policy;

(1-5) a discount factor $\gamma$: representing an influence degree of a future reward on a current;

step 2) based on the scene of the power grid frequency regulation with participation of the energy storage, the state space, the action space and the reward function are determined; each agent obtains from a power grid the state information, comprising a load fluctuation and a frequency deviation of the power grid, upper and lower limit constraints of a frequency regulation capacity of the thermal power unit, and upper and lower limit constraints of charge and discharge of each energy storage apparatus, wherein the state information is integrated into the state space with expression in formula (1):

$$S = \left[\Delta f(t), P_g^+(t), P_g^-(t),\right. \qquad \text{formula (1)}$$
$$\left. P_{bes,1}^+(t), P_{bes,1}^-(t), \ldots , P_{bes,k}^+(t), P_{bes,k}^-(t)\right]$$

wherein $\Delta f(t)$ is the frequency deviation of the power grid at a moment t, $$P_g^+(t)$$

and $$P_g^-(t)$$

are upper and lower capacity limits for a participation of the thermal power unit in the frequency regulation at the moment t, and $$P_{bes,k}^+(t) \text{ and } P_{bes,k}^-(t)$$

are upper and lower charge and discharge limits of the energy storage apparatus k at the moment t;

setting of the number of the multiple agents: one agent is set for frequency regulation apparatuses respectively, and (1+k) agents corresponding to one thermal power unit and k energy storage apparatuses are set; corresponding to different agents, the state space is selected in formula (1) based on own circumstances, the agents of the thermal power unit obtain the frequency deviation and the state information of the upper and lower limits of the thermal power unit; and the agents of the energy storage apparatus obtain the frequency deviation and the state information of the upper and lower charge and discharge limits of the energy storage apparatus;

setting of the action space: the action space of an entire power grid frequency regulation comprises a set of control actions of different agents for the thermal power unit and the energy storage apparatus, with its expression shown in below formula (2):

$$A = [A_g, A_1, \ldots , A_k] \qquad \text{formula (2)}$$

wherein, $$\begin{cases} A_g = \Delta P_g(t) \\ A_k = P_{bes,k}(t) \end{cases} \qquad \text{formula (3)}$$

wherein $\Delta P_g(t)$ represents a power output adjustment amount of the thermal power unit at the moment t, and $\Delta P_{bes,k}(t)$ represents a charge and discharge power of the energy storage apparatus k at the moment t;

setting of the reward function: an expression of the reward function is below formula (4):

$$r_g = \begin{cases} 0 & |\Delta f| < 0.03 \qquad \text{formula (4)} \\ -\mu_1 |\Delta f| & 0.03 \le |\Delta f| < 0.08 \\ -\mu_2 |\Delta f| & 0.08 \le |\Delta f| < 0.12 \\ -\mu_3 |\Delta f| & 0.12 \le |\Delta f| < 0.16 \\ -\mu_4 |\Delta f| & 0.16 \le |\Delta f| < 0.2 \\ -\mu_5 |\Delta f| & 0.2 \le |\Delta f| \end{cases}$$

wherein $r_g$ represents the reward function of the agent of the thermal power unit, r $\mu_1$, $\mu_2$, $\mu_3$, $\mu_4$ and $\mu_5$ represent weight values corresponding to the reward functions of control intervals of the frequency deviation; when the frequency deviation is in an adjustment dead zone [0, 0.03] Hz, the frequency deviation is far less than a minimum error requirement for a normal operation and a reward value of the agent is set to 0; when the frequency deviation is in different set intervals, an agent controller obtains a corresponding negative reward;

$$r_{bes} = \begin{cases} 0 & |\Delta f| < 0.04 \\ -\delta_1 |\Delta f| & 0.04 \le |\Delta f| < 0.08 \\ -\delta_2 |\Delta f| & 0.08 \le |\Delta f| < 0.12 \\ -\delta_3 |\Delta f| & 0.12 \le |\Delta f| < 0.16 \\ -\delta_4 |\Delta f| & 0.16 \le |\Delta f| < 0.2 \\ -\delta_5 |\Delta f| & 0.2 \le |\Delta f| \end{cases} \quad \text{formula (5)}$$

wherein $r_{bes}$ represents the reward function of the agent of the energy storage apparatus; and $\delta_1$, $\delta_2$, $\delta_3$, $\delta_4$ and $\delta_5$ represent the weight values corresponding to the reward functions of the control intervals of the frequency deviation;

step 3) the multiple agents deep deterministic policy gradient algorithm has following flow:

(3-1) setting a total number N of cyclic trainings and initializing an experience replay pool D and a multiple agents policy network $\pi(S_t|\theta)$;

(3-2) setting a round number M of trainings;

(3-3) initializing a current environment state $S_0$;

(3-4) for each agent, based on environment state information of a current moment, generating random actions superimposed with a Gaussian distribution noise to perform an interactive exploration with a power grid environment, with the expression in below formula (6):

$$A = \pi(S_t|\theta) + \lambda \quad \text{formula (6)}$$

wherein $\theta$ represents a policy network parameter of multiple agents, and $\lambda$ represents the Gaussian distribution noise;

(3-5) based on action instructions executed by the multiple agents, returning, by the power grid environment, the corresponding reward function $R_t$ and transferring to a state $S_{t+1}$ of a next moment;

(3-6) storing the information of ($S_t$, $A_t$, $R_t$, $S_{t+1}$) to the experience replay pool;

(3-7) when information stored in the experience replay pool reaches a specified amount $D_x$, performing an update of the multiple agents based on randomly-selected batch data, calculating a corresponding loss function J and using a MSE (Mean Square Error) method to perform a gradient update of a policy network, with its expression in below formula (7):

$$J = \frac{1}{N} \sum_j (y_j - Q(s_j, \pi(s_{j+1}|\theta)|\theta_{critic}))^2 \quad \text{formula (7)}$$

wherein, $$y_j = r_{j+1} + \gamma Q(s_{j+1}, \pi(s_{j+1}|\theta^-)|\theta_{critic}^-) \quad \text{formula (8)}$$

wherein Q represents a state action value function, $\theta$ and $\theta^-$ respectively represent parameters of the policy network and its target network, $\theta_{critic}$ and $\theta_{critic}^-$ respectively represent parameters of an evaluation network and its target network;

(3-8) after training rounds are completed, updating a network parameter with the expression in below formula (9):

$$\begin{cases} \theta^- = \tau\theta + (1-\tau)\theta^- \\ \theta_{critic}^- = \tau\theta_{critic} + (1-\tau)\theta_{critic}^- \end{cases} \quad \text{formula (9)}$$

wherein $\tau$ is an update parameter;

(3-9) after cyclic trainings are completed, obtaining an optimal control multiple agents model;

4) by performing a large number of interactions with an environment, the multiple agents continuously optimizes and updates deep neural network parameters under a guidance of a loss function optimization algorithm, and after the trainings are completed, obtains an optimal control multiple agents policy and takes the policy as a control command layer.

4. An electronic device, comprising a memory, a processor and a computer program stored in the memory and run on the processor, wherein the processor executes the program to perform the control method for power grid frequency regulation with participation of large-scale energy storage based on MADDPG according to claim 2.

5. A non-transient computer readable storage medium, storing a computer program, wherein the computer program is executed by a processor to perform the control method for power grid frequency regulation with participation of large-scale energy storage based on MADDPG according to claim 2.

6. A computer program product, comprising a computer program, wherein the computer program is executed by a processor to perform the control method for power grid frequency regulation with participation of large-scale energy storage based on MADDPG according to claim 2.

7. An electronic device, comprising a memory, a processor and a computer program stored in the memory and run on the processor, wherein the processor executes the program to perform the control method for power grid frequency regulation with participation of large-scale energy storage based on MADDPG according to claim 3.

8. An electronic device, comprising a memory, a processor and a computer program stored in the memory and run on the processor, wherein the processor executes the program to perform the control method for power grid frequency regulation with participation of large-scale energy storage based on MADDPG according to claim 2.

9. A non-transient computer readable storage medium, storing a computer program, wherein the computer program is executed by a processor to perform the control method for power grid frequency regulation with participation of large-scale energy storage based on MADDPG according to claim 3.

10. A non-transient computer readable storage medium, storing a computer program, wherein the computer program is executed by a processor to perform the control method for power grid frequency regulation with participation of large-scale energy storage based on MADDPG according to claim 2.

11. A computer program product, comprising a computer program, wherein the computer program is executed by a processor to perform the control method for power grid frequency regulation with participation of large-scale energy storage based on MADDPG according to claim 3.

12. A computer program product, comprising a computer program, wherein the computer program is executed by a processor to perform the control method for power grid frequency regulation with participation of large-scale energy storage based on MADDPG according to claim 2.

* * * * *